Aug. 8, 1933.  A. BUCHI  1,921,907
EXHAUST TURBO BLOWER FOR INTERNAL COMBUSTION ENGINES
Filed Feb. 2, 1932
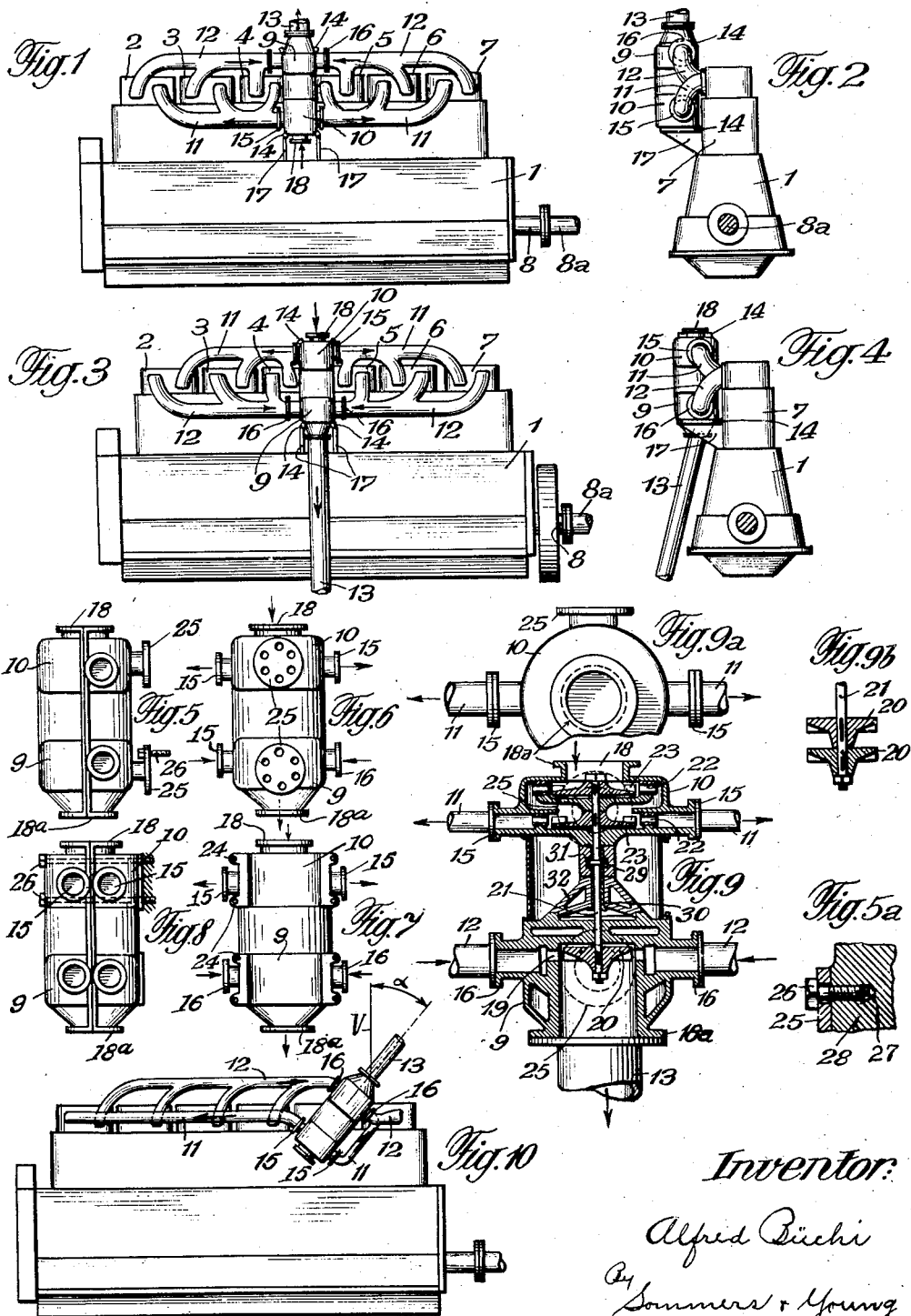
Inventor:
Alfred Büchi
By Sommers + Young
Attys.

Patented Aug. 8, 1933

1,921,907

UNITED STATES PATENT OFFICE 1,921,907

EXHAUST TURBO BLOWER FOR INTERNAL COMBUSTION ENGINES

Alfred Buchi, Winterthur, Switzerland

Application February 2, 1932, Serial No. 590,482, and in Switzerland February 5, 1931

3 Claims. (Cl. 60—13)

This invention relates to turbo aggregates for internal combustion engines and has special reference to turbine driven blowers, whereby the turbines are preferably actuated by the exhaust gases of the internal combustion engines.

One object of the invention is to provide means for connecting the exhaust turbo aggregate directly to the internal combustion engine.

A further object is to improve the design of such turbo aggregates, so that one and the same aggregate can be connected to the internal combustion engine at any desired angle.

Another object of the invention is to provide means on the turbine part and on the blower part or on both parts to connect the turbo aggregate with either of the parts or both parts to the internal combustion engine.

A further object of the invention is the special arrangement of the different connections for the ducts for the air and the exhaust gases. The connections at the exhaust turbo aggregate for the ducts leading to the internal combustion engine are preferably radial whereas the connections from and to the atmosphere are preferably axial.

A preferred embodiment of an exhaust turbo aggregate according to the invention is illustrated in the accompanying drawing.

In said drawing:

Figs. 1 and 2 are diagrammatic views of a six-cylinder internal combustion engine, with the exhaust turbo aggregate in the middle of the engine and the exhaust from the turbine leading upwards.

Figs. 3 and 4 show a similar arrangement with the exhaust from the turbine leading downwards.

Figs. 5 to 8 show means to fix the turbo aggregate to the internal combustion engine.

Fig. 5a is a vertical sectional view of a part of Fig. 5.

Fig. 9 is a section through a turbo aggregate of the preferred form, Fig. 9a is the top view therefrom. Fig. 9b shows details.

Fig. 10 shows the exhaust turbo aggregate disposed at an angle α against the vertical.

Referring to the drawing 1 indicates the internal combustion engine which may be of any known type or design, 2 to 7 are the cylinders, working by means of connecting rods (not shown) on the crankshaft 8 which is connected to a shaft 8a driving a generator, a pump or any other type of machine (not shown), 9 is the turbine part and 10 the blower part of the turbo aggregate. On the common shaft 21 are mounted one or several impellers 20 of the turbine and one or several blower wheels 23. The exhaust gases of the cylinder 2 to 7 are led to the exhaust turbine 9 by means of conduits 12 through guide vanes 19. The air is drawn in through the inlet opening 18, passes through the rotors 23 and through the guide vanes 22 into the air ducts 11, which convey the air to the combustion cylinders 2 to 7. By means of conduit 13 fixed to the outlet 18a of the turbine part 9 the exhaust gases are led to the atmosphere.

The exhaust turbo aggregate 9 and 10 is of the same design for Figs. 1 to 4. In stationary power plants the exhaust gases from the engine are conveyed to the atmosphere preferably by means of conduits below the floor line, in marine installations mainly from the engine directly upwards to the funnel. In installations for traction purposes the exhaust gases may escape to the atmosphere on the roof of the vehicle or underneath the vehicle as the case may be. According to this invention one and the same exhaust turbo blower can be fixed to an internal combustion engine in different ways: with the blower part on top of the turbine part or vice versa, with the exhaust gases escaping at the top or at the bottom of the aggregate and furthermore the axis of the turbo blower aggregate may be inclined at any angle (from 0° to 360 degr.) to a vertical. An internal combustion engine provided with such an aggregate can therefore be used for marine, traction, stationary purposes without alterations being necessary, and with one type of turbo aggregate suitable for all purposes.

In Figs. 1 and 2 the turbine part 9 is on top of the blower part 10 and the exhaust gases escape from the top upwards through conduit 13. The aggregate is connected to the internal combustion engine 1 by a flange 25 and studs or bolts 26. This flange is provided on the blower part of the turbo aggregate. Instead of providing for a flange the bolts or studs may pass along the side walls of the blower part and suitable bosses 24 may be provided for said bolts or studs as shown in Figs. 7 and 8.

The turbo aggregate 9, 10 may also be supported by bosses 14 on brackets 17, fastened to the engine in any known way. The conduits 11 for the charge connect the pressure part of the blower to the combustion cylinders 2 to 7. The conduits 12 for the exhaust gases lead to the turbine part of the turbo aggregate.

In Figs. 3 and 4 the same exhaust turbo aggregate 9, 10 is shown connected to the same engine, but turned around by 180 degr. The exhaust turbine part 9 is below the charging blower part 10. The conduits 11 for the charging air lead to the top of the aggregate to the blower part 10, the conduits 12 for the exhaust gases lead to the turbine part 9 of the aggregate. The whole exhaust turbo aggregate 9, 10 may be fixed to the internal combustion engine in a similar way as explained in connection with Figs. 1 and 2.

In Figs. 1 to 4 the exhaust turbo aggregate is shown to be placed symmetrical with respect to the combustion cylinders, but it may also be nearer to one end or at one end of the internal combustion engine.

In Figs. 5 and 6 a flange 25 is shown with bolts 26, which are arranged on a circle of the same diameter as the bolt holes 27 of the corresponding part or flange 28 (Fig. 5a) of the internal combustion engine. It is therefore possible by properly drilling the holes in the flange to connect the turbo aggregate at any angle α (between 0 degr. and 360 degr.) to the internal combustion engine. The angle α is shown in Fig. 10, where the exhaust turbo aggregate is disposed nearer to the one end of the engine and inclined against the vertical V at an angle α.

Fig. 9 represents a section through a preferred embodiment of the exhaust turbo blower aggregate 9, 10, showing the radial connection (15, 16) for the charge and for the exhaust gases respectively as well as the axial connections (18a, 16a) to the atmosphere for the air and for the exhaust gases respectively. Shaft 21 is provided with a collar 29, which is carried in a suitable bearing shell 30 and transferring the axial forces to a corresponding collar of the bearing shell 30. The axial forces are taken up by the bearing shell 30, this latter being carried by the intermediate pieces 31 and 32 connecting the turbine part 9 with the blower part 10.

Fig. 9a is the top view of Fig. 9.

Fig. 9b shows the turbine end of the shaft 21 of a multi stage turbine provided with two turbine impellers 20.

It is to be understood that this invention is not limited to the exact details of construction shown and described, for obvious modifications will occur to a person skilled in the art, without departing from the spirit of this invention.

I claim:

1. An exhaust turbo aggregate for internal combustion engines, comprising in combination an exhaust turbine, an impeller therein, a blower, blower wheels therein, means to connect said turbine to said blower, said means including a common shaft, a housing for said turbine, a housing for said blower, said housings completely enclosing the turbine and blower, an intermediate piece between said two housings, a bearing, said bearing being adapted to be loaded in every direction, radial inlet connections at said turbine housing, radial outlet connections at the blower housing, and means to connect said exhaust turbo aggregate to an internal combustion engine at any desired angle of 0° to 360° between a vertical and the axis of the exhaust turbo aggregate.

2. An exhaust turbo aggregate for internal combustion engines, comprising in combination an exhaust turbine, an impeller therein, a blower, blower wheels therein, means to connect said turbine to said blower, said means including a common shaft, a housing for said turbine, a housing for said blower, said housings completely enclosing the turbine and blower, an intermediate piece between said two housings, a bearing, said bearing being adapted to be loaded in every direction, radial inlet connections at said turbine housing, radial outlet connections at the blower housing and means to connect said exhaust turbo aggregate to an internal combustion engine at any desired angle of 0° to 360° between a vertical and the axis of the exhaust turbo aggregate, said means to connect the exhaust turbo aggregate to the internal combustion engine being provided at the turbine part as well as at the blower part of the turbo aggregate.

3. An exhaust turbo aggregate for internal combustion engines, comprising in combination an exhaust turbine, an impeller therein, a blower, blower wheels therein, means to connect said turbine to said blower, said means including a common shaft, a housing for said turbine, a housing for said blower, said housings completely enclosing the turbine and blower, an intermediate piece between said two housings, a bearing, said bearing being adapted to be loaded in every direction, radial inlet connections at the blower housing and means to connect said exhaust turbo aggregate to an internal combustion engine at any desired angle of 0° to 360° between a vertical and the axis of the exhaust turbo aggregate, said means to connect the exhaust turbo aggregate to the internal combustion engine being provided at the turbine part as well as at the blower part of the turbo aggregate and said turbo aggregate being connected to the internal combustion engine with either one means.

ALFRED BUCHI.